C. H. WORDINGHAM.
SYSTEM FOR DISTRIBUTING ELECTRIC ENERGY.
APPLICATION FILED AUG. 12, 1918.

1,304,237.

Patented May 20, 1919.
2 SHEETS—SHEET 1.

INVENTOR
C. H. Wordingham.
BY H. R. Kerslake
ATTORNEY

C. H. WORDINGHAM.
SYSTEM FOR DISTRIBUTING ELECTRIC ENERGY.
APPLICATION FILED AUG. 12, 1918.
1,304,237.
Patented May 20, 1919.
2 SHEETS—SHEET 2.
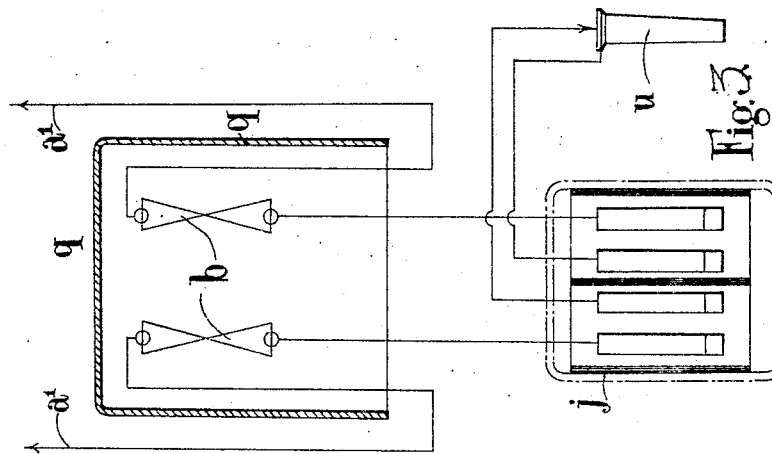
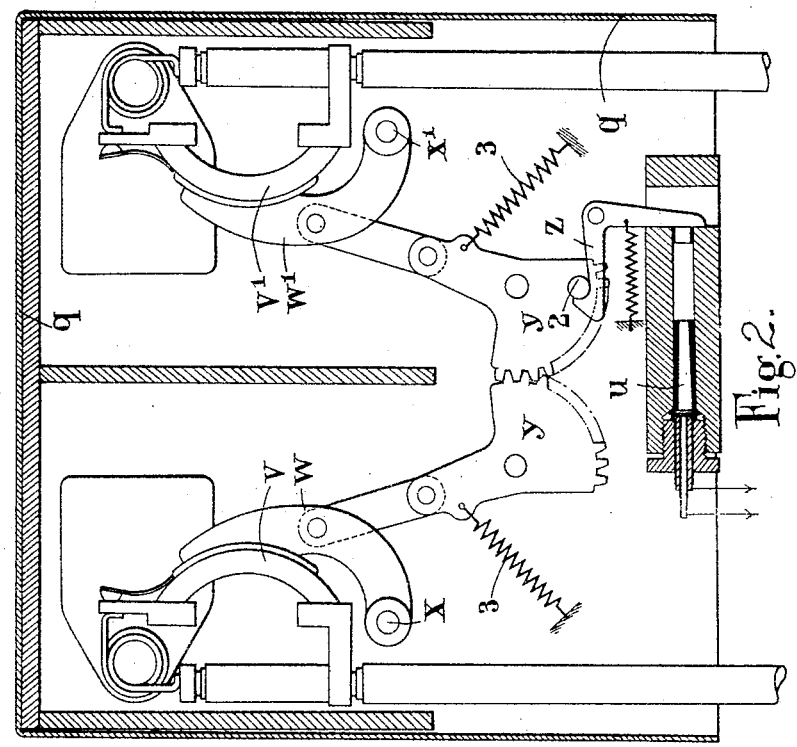
INVENTOR
C. H. Wordingham
BY H. R. Kerslake
ATTORNEY

UNITED STATES PATENT OFFICE.

CHARLES HENRY WORDINGHAM, OF REDHILL, ENGLAND.

SYSTEM FOR DISTRIBUTING ELECTRIC ENERGY.

1,304,237.       Specification of Letters Patent.       Patented May 20, 1919.

Application filed August 12, 1918. Serial No. 249,575.

*To all whom it may concern:*

Be it known that I, CHARLES HENRY WORDINGHAM, of Beechgroove, Ridgeway Road, Redhill, in the county of Surrey, England, a subject of the King of Great Britain and Ireland, have invented certain new and useful Improvements in Systems for Distributing Electric Energy, of which the following is a specification.

This invention relates to systems for distributing electric energy, and particularly to systems adopted in marine vessels, mines or other localities, parts of which are liable to flooding.

Experience has proved that in many instances it is desirable to continue to transmit electric energy through the flooded part or compartment, while it is generally desirable to discontinue the supply of energy to the consuming devices fitted within the said part or compartment.

The object of my invention is to enable the above requirements to be fulfilled, and the invention consists in providing means for disconnecting the whole of the branch circuit or circuits in the flooded area from the main or mains from which the supply is obtained, while leaving the main or mains intact and in continued operation.

More specifically the invention consists in providing for each pole of each tapping from the main, means for disconnecting the branch circuit or tapping, operable on the flooding of the particular part or compartment to which such circuit or tapping extends, the invention being independent of the number of tappings adopted.

The invention also consists in providing means whereby the rising of the water in the flooded part or compartment to a predetermined level may actuate the branch circuit or tapping disconnecting means.

Referring to the accompanying sheets of explanatory drawings:—

Fig. 2 is a sectional elevation of a disconnecting means.

Fig. 3 is a diagram illustrating a modified arrangement of circuit breaking or disconnecting means applicable for disconnecting a plurality of circuits.

The same reference letters in the different views indicate the same or similar parts.

Figure 1:
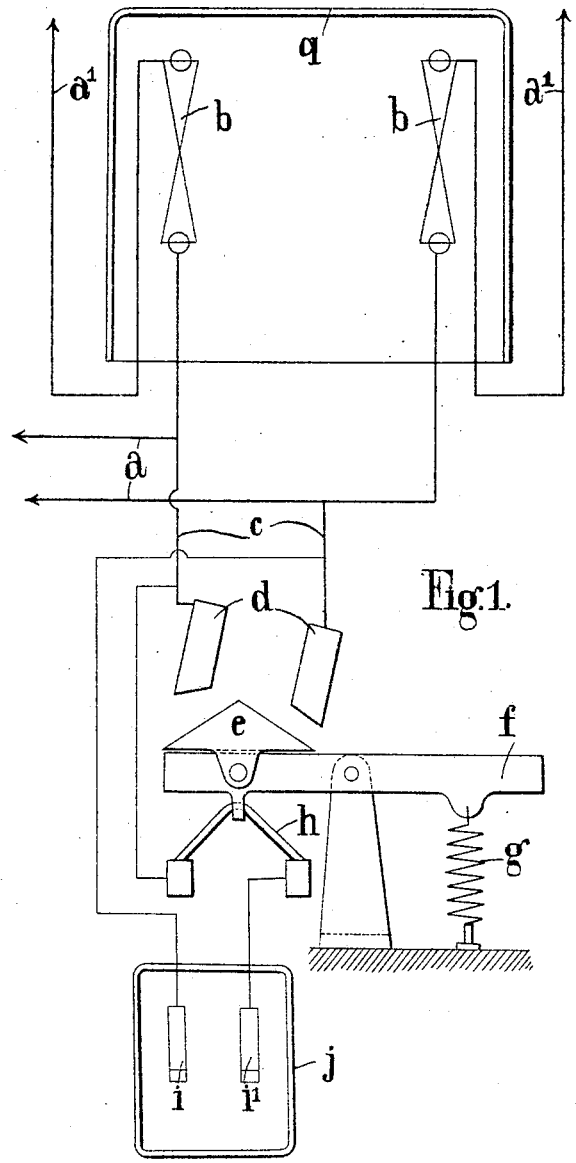
Figure 1 is a diagrammatic view illustrating one convenient application of my invention.

In carrying my invention into effect in the manner illustrated at Fig. 1, which may be applied to a system of distributing electric energy in a marine vessel where, for example, any particular compartment may be liable to be flooded through damage to the hull or other cause, I provide for each pole $a'$ of each tapping from the ring or other main, a disconnecting device which may take the form of a main fuse $b$ on each pole through which the whole supply to the tapping passes, and a shunt circuit $c$ may be provided for short circuiting the circuit controlled by such main fuses $b$, the shunt circuit being completed automatically on the rising of the flood water to a predetermined level. In the Fig. 1 example, the fixed contacts $d$ of the shunt circuit are adapted to be bridged across by the movable contact $e$ pivotally mounted on the lever $f$. The tension coil spring $g$ tends to force the movable contact $e$ on to the fixed contacts $d$, but is resisted by the fuse wire $h$. The latter forms part of a subsidiary circuit containing two terminals $i$, $i'$ the circuit between which is completed by the flooding water when the vessel or container $j$ in which the terminals are housed becomes immersed. (Hereinafter the part of the disconnecting means which is operated by the flooding water is termed the flood switch.) When therefore the circuit containing the terminals $i$ and $i'$ is completed by the flooding water, the wire $h$ is fused and the spring $g$ thereupon forces the movable contact $e$ against the fixed contacts, so completing the shunt circuit which short-circuits the branch circuit or tapping and causes the blowing of the fuses $b$, whereby the branch circuit is disconnected from the main. The lever $f$ may be held by a catch released by a detonator as in Fig. 2.

It is essential that the terminals which are connected to the mains and remain alive after disconnection of the branch circuit, shall be always maintained out of contact with the flooding water. This is conveniently accomplished by disposing the disconnecting means, which in the Fig. 1 arrangement comprise the fuses $b$ and the upper terminals, within a vessel $q$ of diving bell form, so proportioned that should flooding occur, the water will never reach to a sufficient height therein to come into contact with the live terminals.

As a further type of disconnecting means, I may employ a circuit breaker such as diagrammatically shown in Fig. 2. In this case movable contacts $v$, $v'$ are mounted on carrier arms $w$, $w'$ fulcrumed at $x$, $x'$ and operated from intermeshing toothed quadrants $y$ held in their service position by a catch piece $z$ engaging the pin 2. The detonator $u$ which is fired by the closing of a shunt circuit by the flood switch actuates the said catch piece $z$ which frees the quadrants so that under the action of the springs 3, 3, the movable contacts $v$, $v'$ are withdrawn from the fixed contacts. The branch circuit is thus disconnected. The connections from the mains leading to the fixed contacts are mounted and supported so as to be at the upper inside portion of the diving bell $q$, whereby they are shielded from contact with the flood water. The circuit breaker is provided with spark contacts, and with the necessary arc-shields to suit requirements.

The auxiliary or shunt circuits may take their supply from the side of the disconnecting device remote from the main, so that such circuits may be disconnected when the device operates, but it will be understood that I do not wish to confine myself to such an arrangement. One side of the auxiliary circuit may, if desired, be connected with the main side of the break or disconnecting means. In the latter case, however, I preferably employ fuses $b$ within a diving bell $q$ (see Fig. 3) for cutting off the auxiliary circuit $c$ and keeping the live terminals water free if there should be an excessive leak through the auxiliary circuit after the disconnecting device has operated.

The invention is applicable with equal advantage not only to power and light circuits but also to any other electric circuits terminating in instruments or apparatus in a part or compartment liable to flooding.

In applying my invention to such arrangements, I may take the whole of the circuits terminating in instruments in any one compartment through a multiple switch or switches and provide means for disconnecting such switch or switches similar to the means before described for disconnecting the power and lighting branch from the power and lighting main.

It will be understood that while I have described the method of carrying the invention into effect by reference to its application to the circuit of a marine vessel, I may employ the invention with equal effect and like advantage in any situation where it is desirable that a branch circuit should be put out of action without interfering with the main, and the invention is also applicable, whatever may be the main system adopted, and I suitably vary the form of construction of the disconnecting means, including the flood switches to suit any particular services or requirements.

Having now described my invention what I claim as new and desire to secure by Letters Patent is:—

1. In systems for distributing electric energy, disconnecting means provided with live terminals, a casing inclosing said disconnecting means and terminals and including an imperforate top, imperforated sides and an open bottom, said casing maintaining the live terminals out of contact with water, when the casing is submerged, by trapping air beneath the top of the casing and preventing water from rising therein, a flood switch exposed to the flooding water, conducting wires connecting the flood switch and disconnecting means, and means controlled by said flood switch for causing the actuation of said disconnecting means.

2. In systems for distributing electric energy, disconnecting means, a casing inclosing said disconnecting means and including an imperforate top, imperforate sides and an open bottom, said casing maintaining the disconnecting means out of contact with water, when the casing is submerged, by trapping air beneath the top of said casing and preventing water from rising therein, a flood switch consisting of terminals, the circuit between which is completed by the flooding water, conducting means connecting the flood switch and disconnecting means, and a detonator arranged in the conducting means and controlled by the flood switch for causing the actuation of said disconnecting means.

In testimony whereof I have signed my name to this specification.

CHARLES HENRY WORDINGHAM.

Copies of this patent may be obtained for five cents each, by addressing the "Commissioner of Patents, Washington, D. C."